L. W. CHUBB.
CIRCUIT INTERRUPTER.
APPLICATION FILED JULY 3, 1914.
1,341,631.
Patented June 1, 1920.
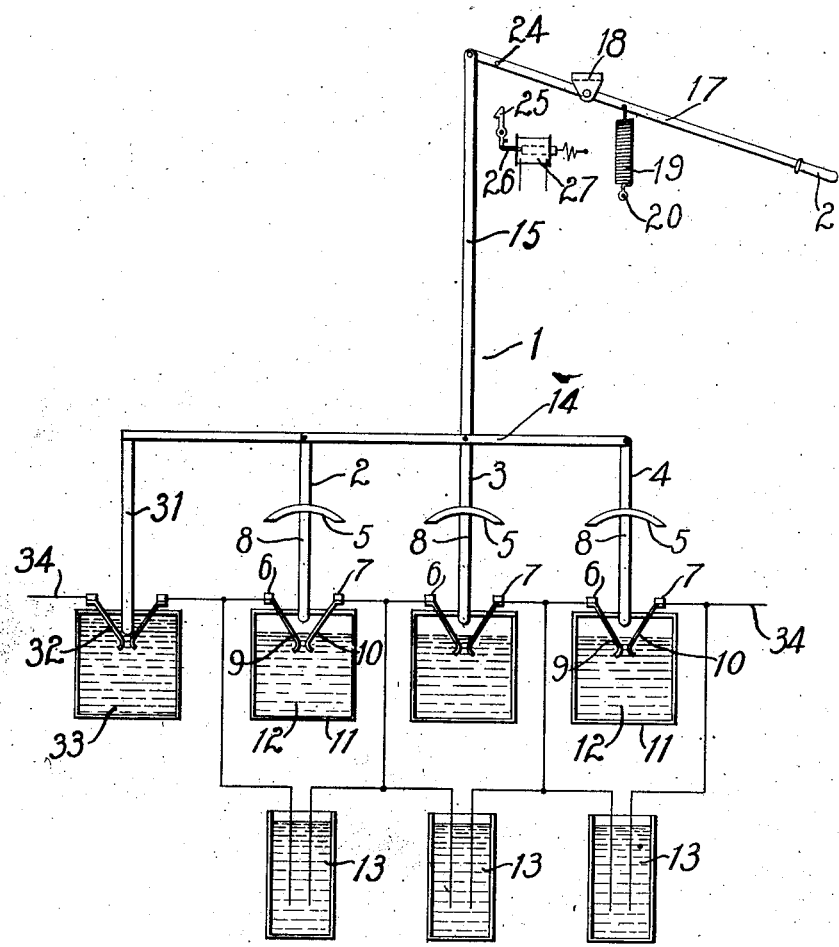
WITNESSES:
A. J. Fitzgerald
O. W. Kennedy
INVENTOR
Lewis W. Chubb.
BY
Wesley G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

CIRCUIT-INTERRUPTER.

1,341,631.      Specification of Letters Patent.      Patented June 1, 1920.

Application filed July 3, 1914. Serial No. 848,800.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Circuit-Interrupters, of which the following is a specification.

My invention relates to circuit interrupters and particularly to non-arcing types of the same.

One object of my invention is to provide a circuit interrupter for interrupting relatively high-voltage circuits without the sparking and burning that is usually incident thereto.

Another object of my invention is to provide a circuit interrupter with aluminum or other suitable film-forming contact members which are immersed in an oxygen-containing electrolyte, thereby providing an electrolytic condenser at the point of interrupting the circuit.

It is old in the art to connect an electrolytic condenser around the terminals of a circuit interrupter for the purpose of dissipating the electromagnetic energy of the circuit and for preventing arcing and sparking at the contacts of the circuit interrupter. However, in order to prevent all sparking at the contacts it would be necessary to eliminate all the inductance in the condenser circuit so that there would be an infinite rate of increase of current in this circuit and an instantaneous interruption of the current through the contacts at the instant of separation. This is not practicable unless the condenser capacity is applied at the point of interruption and unless the capacity is high enough in value at this point to prevent the voltage between the contacts from rising to a value higher than the equivalent instantaneous breakdown voltage of the gap between the contacts. This capacity applied at the point of interruption must also be enough to allow time for the current to build up in a condenser circuit connected across the contacts.

I have provided means for inserting electrical capacity and valve action in the circuit at the point of separation for the purpose of decreasing the time required for the voltage to rise; for limiting the ultimate rise of the voltage to absorb the energy; for increasing the area over which the energy is dissipated, and for changing the time constant so that a condenser connected in shunt will be more effective in absorbing and dissipating the electromagnetic energy of the system at the instant the circuit is interrupted.

The single figure of the accompanying drawing is a diagrammatic view of a circuit interrupter embodying my invention.

I have provided a circuit interrupter 1 having a plurality of substantially similar switch units, 2, 3, and 4 severally comprising main bridging contact members 5, main stationary contact members 6 and 7, movable auxiliary contact members 8, relatively stationary auxiliary contact members 9 and 10, receptacles 11 containing an electrolyte 12 and electrolytic condensers 13 connected in shunt relation to the main stationary contact members 6 and 7. The auxiliary contact members 8, 9, and 10 are constructed of aluminum or of any other polarized or film-forming metal, and they are immersed in the electrolyte 12, substantially as shown in the drawing.

The movable members of the units 2, 3, and 4 are connected together by an insulating bar 14 which is connected, by a rod 15, to a lever arm 17. The lever arm 17 is pivotally mounted, at a point intermediate its ends, upon a stationary bracket 18. A spring 19 is connected at one of its ends to the lever arm 17 and its other end to a stationary point 20. The lever arm 17 has an operating handle 21 attached to one end thereof. A pin 24 is mounted on the lever 17 for latching the interrupter in its closed position by means of a latch 25, operatively connected to the movable member 26 of a latching device 27. To the bar 14 is attached a movable contact member 31 which is relatively longer than the contact members 8. The contact member 31 coöperates with the relatively stationary contact members 32 immersed in an oil-containing receptacle 33, for purposes hereinafter set forth.

The several units 2, 3, and 4 must be connected in series, since the voltage to which each of the electrolytic condensers 13 may be subjected without discharging is limited. This depends, of course, upon the electrolyte in which they are immersed, those immersed in ammonium borate and boric acid being capable of standing substantially 500 volts and those immersed in an electrolyte of ammonium phosphate solution being capable of standing substantially 280 volts between the plates.

Assuming the parts of the apparatus to be in the positions shown in the drawing and that it is desired to complete the circuit through the conductor 34, my invention operates as follows:

The lever 17 is raised upwardly against the tension of the spring 19 to lower the rod 15. The movable member 31 engages the resilient contact members 32 when the rod 15 moves downwardly, thus connecting the electrolytic condensers 13 in circuit. The movable members 8 engage the resilient contact members 9 and 10 to complete an auxiliary circuit of the conductor 34. A relatively short time interval after the auxiliary contacts are closed, the bridging contact members 5 engage the main stationary contact members 6 and 7 to complete the main circuit of the conductor 34. After the circuit is completed, the latch 25 engages the pin 24 to retain the switch in its closed position.

If it is desired to open the circuit, the latching device 27 is energized to disengage the latch 25 from the pin 24 and the spring 19 causes the rod 15 to move upwardly. The main bridging contact members 5 disengage from the stationary contact members 6 and 7, and the auxiliary contact members 8, 9 and 10 carry the current for a relatively short time. As the rod 15 moves farther upwardly, the auxiliary members 8 disengage the auxiliary contact members 9 and 10 and form condensers at the points of interruption. The members 9 and 10 will be charged as condensers and the voltage between members 9 and 10 will rise relatively slowly to a value that is less than the critical voltage of the electrolyte used. This rise of voltage will be slow enough to allow the current to build up and be diverted into the condenser circuits connected in shunt relation to the contacts 6 and 7. The condensers 13 will become charged and, if the energy is sufficient to raise the voltages above the breakdown value of the electrolyte of the same, there will be a dissipation of energy equally distributed over the positive electrodes of the condensers 13. Since the discharge voltage of the cells is higher than the line potential, only the electromagnetic energy of the system is absorbed and the reflection of high voltage waves into the circuit is prevented when this energy is absorbed.

After the current has been reduced to a low value, the rod 15 is moved upwardly a sufficient distance to disengage the movable members 31 and 32 so as to prevent the leakage of the condenser current through the electrolytic cells.

Any number of units 2, 3, and 4 may be used, and any electrolyte of high conductivity may be used which will form a polarized film on the contact members 8, 9 and 10. Although the contact members 31 and 32 may be hand operated, it is best to have the same operated automatically after the current has been reduced.

My invention is not limited to the particular construction illustrated, but is capable of various modifications within the scope of the appended claims.

I claim as my invention:

1. A circuit interrupter comprising contact members having film-forming properties and an electrolyte in which the said contact members are immersed, said contact members being adapted to coöperate with the electrolyte to form an electrolytic condenser having a critical voltage higher than the open-circuit voltage of the electrical circuit.

2. A circuit interrupter comprising contact members having film-forming properties and an electrolyte in which the said contact members are immersed, said contact members being adapted to coöperate with the electrolyte to form an electrolytic condenser at the points of disengagement of the contact members having a critical voltage higher than the open-circuit voltage of the electrical circuit.

3. A circuit interrupter comprising contact members having film-forming properties and an electrolyte in which the said contact members are immersed, said contact members being adapted to coöperate with the electrolyte to form an electrolytic condenser of sufficient capacitance to store the electromagnetic energy of the current without conduction.

4. A circuit interrupter comprising contact members having film-forming properties and an electrolyte in which the said contact members are immersed, said contact members being adapted to coöperate with the electrolyte to form an electrolytic condenser of sufficient capacitance to store the electromagnetic energy of the current without reaching the critical voltage of the electrolyte.

5. A circuit interrupter comprising contact members having film-forming properties and an electrolyte in which said contact members are immersed, certain of said contact members being adapted to constitute electrodes to coöperate with the electrolyte to form an electrolytic condenser having a critical voltage high enough to stop the current without removing the electrodes from the electrolyte.

6. A circuit interrupter comprising coöperating film-forming contact members and a film-forming electrolyte in which the contact members are permanently immersed, said contact members being adapted to form a condenser beginning at their points of disengagement of such capacitance as to prevent arcing.

7. A circuit interrupter comprising a bridging member and two stationary contact members having film-forming properties, and an electrolyte in which the said contact members are permanently immersed, the capacitance constituted between the contact members when the bridging member is disengaged being sufficient to preclude any arcing therebetween.

8. In a circuit interrupter, the combination with two contact members having film-forming properties, and an electrolyte in which the contact members are immersed, of an electrolytic condenser connected across the said contact members, said contact members being adapted to form a condenser at their points of disengagement to preclude the voltage between the contacts from rising to a value higher than the equivalent instantaneous breakdown voltage therebetween.

9. In a circuit interrupter, the combination with two contact members having film-forming properties, and an electrolyte in which the contact members are immersed, of an electrolytic condenser connected across the said contact members, said contact members being adapted to form a condenser at their points of disengagement to allow sufficient time for the current to build up in the said condenser that is connected across the contact members.

10. The method of interrupting an electrical circuit which consists in connecting an electrolytic condenser across the terminals of a circuit interrupter and producing a condenser of such capacitance at the points of disengagement of the contact members that the current in the electrolytic condenser has sufficient time to build up to its correct value.

11. In a circuit interrupter, the combination with contact members having film-forming properties, and an electrolyte in which said contact members are immersed, of an electrolytic condenser connected across said contact members, said contact members being adapted to form a condenser of such capacitance as to limit the rate of rise of voltage across the contact members sufficiently to permit the current to be diverted through the electrolytic condenser.

12. A circuit interrupter comprising coöperating film-forming contact members and a film-forming electrolyte in which the contact members are permanently immersed, and means whereby the current traversing the contact members is changed from conducting to capacity current without change in the path at the first instant and point of disengagement.

In testimony whereof, I have hereunto subscribed my name this 23rd day of June, 1914.

LEWIS W. CHUBB.

Witnesses:
W. O. Lum,
B. B. Hines.